United States Patent Office 3,578,393
Patented May 11, 1971

3,578,393
PREPARATION OF CALCIUM HYPOCHLORITE
FROM HYPOCHLOROUS ACID SOLUTIONS
John A. Wojtowicz, Cheshire, Conn., Milton Lapkin,
Barrington, R.I., and Mohindar S. Puar, East Brunswick, N.J., assignors to Olin Corporation
No Drawing. Continuation-in-part of application Ser. No. 792,761, Jan. 21, 1969. This application Aug. 25, 1969, Ser. No. 852,895
Int. Cl. C01b 11/04, 11/06
U.S. Cl. 23—86
6 Claims

ABSTRACT OF THE DISCLOSURE

Solutions of hypochlorous acid (HOCl), free from chloride, which are prepared by extraction of aqueous chlorination mixtures containing HOCl and chloride using an extraction solvent selected from the group consisting of lower alkyl ketones, lower alkyl cyanides and lower alkyl esters of lower alkanoic acids, are reacted with lime to produce a slurry of calcium hypochlorite in the solvent. The solid is separated from the solvent to obtain the calcium hypochlorite product in excellent yields of high quality material.

RELATED APPLICATION

This application is a continuation-in-part of co-pending U.S. Ser. No. 792,761, filed Jan. 21, 1969.

This invention relates to an improved process for the production of calcium hypochlorite by the reaction of lime with substantially chloride-free solutions of hypochlorous acid in certain organic solvents. The preparation of said hypochlorous acid solutions is more fully described in the specification of the parent application identified above and said parent application is incorporated herein by this reference.

It is a principal object of this invention to provide a process for the efficient and economical production of calcium hypochlorite having high available chlorine content and having improved stability in storage due to the low content of calcium chloride.

A further object of this invention is the production of improved calcium hypochlorite compositions by reacting lime with hypochlorous acid solutions which are substantially free from calcium chloride.

A still further object of this invention is to react lime with a solution of hypochlorous acid in certain organic solvents, substantially free from calcium chloride to produce calcium hypochlorite compositions of improved quality and stability in high yields.

Hypochlorous acid, usually in the form of its aqueous solutions, is employed in a relatively large number of chemical and industrial processes. For example, hypochlorous acid solutions are sometimes employed for the manufacture of hypochlorites, particularly when it is desired to produce high grade hypochlorites which are substantially free from various undesirable impurities.

One of the common methods of synthesis of a hypohalous acid solution includes the reaction between water and a halogen. For instance, the production of hypochlorous acid by the reaction of chlorine and water follows the equation:

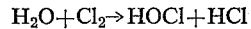

$$H_2O + Cl_2 \rightarrow HOCl + HCl$$

In order to neutralize the hydrochloric acid formed as a result of the aforementioned reaction, it is customary to employ an alkali, such as sodium or calcium hydroxide, or the like. The addition of such alkali neutralizes the hydrochloric acid, but simultaneously forms an inorganic halide, which, in most cases, is water-soluble, thus forming an aqueous hypochlorous acid solution containing a greater or lesser concentration of halide ions. The presence of this inorganic halide in the hypochlorous acid solution is highly undesirable when the hypchlorous acid is employed for reaction with lime to form calcium hypochlorite. The resulting calcium chloride in the calcium hypochlorite very deleteriously affects the stability of the product and leads to intolerable losses of available chlorine on storage. In contrast with calcium chloride, sodium chloride is commonly used as an inert diluent in calcium hypochlorite compositions and it improves the stability of calcium hypochlorite compositions containing it.

It is known in the art that aqueous hypochlorous solutions can be separated from associated materials by extraction. However, the known methods generally do not form true solutions. The polyhalogenated aliphatics which are mentioned as suitable solvents extract only trace amounts of hypochlorous acid from aqueous solutions. The prior art also suggests that the presence of a small amount of alcohol is desirable. It is well known that alcohols react readily with hypochlorous acid to form organic hypochlorites so that extraction of hypochlorous acid in the presence of an alcohol does not lead to hypochlorous acid solutions but rather to solutions of compounds of hypochlorous acids. See, for example, Sandmeyer, Ber. 18, 1767 (1885); 19, 859 (1886); Taylor et al., J. Am. Chem. Soc. 47, 395 (1925) and U.S. Pats. 1,481,039; 1,482,040; 1,632,483; 1,632,484 and 1,632,485.

However, certain solvents have now been discovered which extract hypochlorous acid essentially free of chloride without concomitant compound formation. These solvents also have the very important advantage of being chemically stable to hypochlorous acid at low temperatures and having reasonable chemical stabilities at ambient conditions, thereby permitting their use for the intended purposes. These solvents having the unusual and unexpected property of being able to extract hypochlorous acid from aqueous salt solutions to produce organic solutions of hypochlorus acid essentially free of chloride ion are selected from the group consisting of lower alkyl ketones, lower alkyl cyanides and lower alkyl esters of lower alkanoic acids where said lower alkyl contains from 1 to 5 carbons inclusive. Examples of useful solvents include acetone, methyl ethyl ketone, methyl isobutyl ketone, diethyl ketone, di-n-propyl ketone, acetonitrile (methyl cyanide), propionitrile (ethyl cyanide), methyl acetate, ethyl acetate and methyl propionate.

It has further been discovered that the extractions need not be conducted as a separate step, since the solvents can also be present during the formation of the hypochlorous acid. The extractant can therefore serve as a co-solvent and remove the hypochlorous acid from the reaction site as it forms. The process thus generally comprises preparing solutions of hypochlorous acid substantially free from chloride by mixing at temperatures of +10° to −30° C. an aqueous solution containing chloride and hypochlorous acid with an extraction solvent selected from the class consisting of lower alkyl ketones, lower alkyl cyanides and lower alkyl esters of lower alkanoic acids and separating the resulting solution of hypochlorous acid in said solvent from the resulting aqueous phase. The product comprises a solution of hypochlorous acid in a solvent selected from the gorup consisting of lower alkyl ketones, lower alkyl cyanides and lower alkyl esters of lower alkanoic acids. In the present specification and claims the lower alkyl groups are meant to include those having 1 to 5 carbon atoms, inclusive. Also the lower alkanoic acids have 1 to 5 carbon atoms, inclusive.

By varying the water content of the aqueous mixture of base which is chlorinated to produce HOCl and by varying the proportion of extraction solvent, the concentration of HOCl in the solvent is suitably controlled to produce solutions having a concentration of HOCl of from 0.1 molal or less to about 10 molal or more, 0.525 percent to 52.5 percent by weight. Conveniently solutions of about 0.5 to 5 molal are readily prepared, stored and used. These solutions are stable at temperatures below 0° C. and are sufficiently stable for use when stored at ambient temperatures for several days.

In the preparation of aqueous hypochlorous acid for use in the extraction process by chlorination of aqueous alkali, chloride is concomitantly formed in the solution according to the equation above. In a particularly advantageous form of the process, additional chloride is added to the aqueous hypochlorous acid or to the aqueous mixture of alkali to be chlorinated. The additional chloride lowers the freezing point of the aqueous phase and facilitates chlorination and extraction at lower temperatures. Advantageously, though not necessarily, the chlorinations are carried out in the range of about 0° to −30° C. The extractions are suitably carried out at temperatures of about +10° to −30° C. Since the stability of the HOCl in the aqueous chloride solution before extraction is somewhat less than in the organic solution after extraction.

Alkalies suitable for use in chlorination to form the aqueous chloride-containing solution of HOCl to be extracted are suitably any alkali which with chlorine forms HOCl. More particularly useful are the alkaline compounds of the alkali metals and alkaline earth metals. Their oxides, hydroxides and carbonates are suitable including specifically sodium hydroxide, potassium hydroxide, sodium carbonate, calcium oxide, calcium hydroxide and calcium carbonate. Other alkaline compounds of the alkali metals and alkaline earth metals are also suitable.

While chlorination of alkalies, as described, is cheap and convenient for the preparation of aqueous solutions of HOCl, the solutions to be extracted are suitably prepared by any other known methods.

The process of the present invention utilizes the chloride-free hypochlorous acid solutions prepared as described above and, with special advantage, the solutions in methyl ethyl ketone (MEK). The MEK solutions suitably contain from 0.5 to 50 percent by weight of HOCl and minor amounts of water, from 0.1 up to about 5 percent. The HOCl solutions are reacted with solid anhydrous quicklime or solid slaked (hydrated) lime, preferably in finely divided form, with agitation until the base is converted to calcium hypochlorite and a slurry of dihydrate of the formula $Ca(OCl)_2 \cdot 2H_2O$ is formed in the MEK or other solvent. The molar ratio of hypochlorous acid to lime is at least 2:1. The reaction temperature is not critical but the reaction is preferably carried out at temperatures of about 0° to −25° C. However, temperatures up to about 30° C. are suitable. Most of the reaction occurs in the course of a few hours at these temperatures but the reaction mixture is advantageously maintained at a low temperature for up to 3 days to complete the reaction. The solid product is separated in any convenient manner, suitably by filtration or centrifugation and the cake is dried, suitably in vacuum to remove solvent and moisture. The separated calcium hypochlorite dihydrate is thus separated to contain less than 2 percent by weight of water. Yields are usually 90 percent or better.

EXAMPLE I

Slaked lime (3.33 g.; 43 millimoles) was added to 63.3 grams of a solution of HOCl in methyl ethyl ketone containing 90 millimoles of HOCl. The mixture stood with occasional shaking at a temperature of −25° C. for 3 days. The mixture was filtered, the solvent was removed in vacuum and the residual solid was vacuum dried at 50° to 69° C. under 0.1 mm. The dried calcium hypochlorite product contained 78.2 percent of available chlorine. Yield, based on the lime, was 91 percent.

EXAMPLE II

A mixture of slaked lime (7.0 g.; 98.2 percent assay; 93 millimoles) and 4 g. of sodium chloride as inert diluent was added to 75 g. of a cold (−25° C.) MEK solution containing 208 millimoles of HOCl. An immediate reaction occurred resulting in a temperature rise to about 30° C. After several hours at −25° C., the reaction mixture was filtered and the wet filter cake was subjected to water aspirator vacuum to free it of solvent. The solvent-free product weighed 22.6 g. and contained 63.9 percent available chlorine on an anhydrous basis, 2.6 percent unreacted $Ca(OH)_2$, balance NaCl. The filtrate contained 27 millimoles of unreacted HOCl. The yield of $Ca(OCl)_2$ based on lime was 94 percent.

EXAMPLE III

Calcium oxide (5.6 g., 97.8 percent assay; 98 millimoles) was slurried in 140.5 g. of cold (−25° C.) methyl ethyl ketone solution of HOCl (1.5 molal). After standing for 24 hours at −25° C. with occasionally stirring, the mixture was filtered through a coarse frit and the solid was freed of residual solvent under water aspirator vacuum. The filtrate contained 12 millimoles of unreacted HOCl. The solvent-free product weighed 18.4 g. and contained 76.6 percent $Ca(OCl)_2$ on an anhydrous basis and 4.8 percent of $Ca(OH)_2$. Yield of $Ca(OCl)_2$ based on lime was 92 percent.

EXAMPLE IV

Slaked lime (7.4 g., 98.2 percent assay; 98 millimoles) was reacted as in Example III with 138.5 g. of a cold methyl ethyl ketone solution of 1.5 molal HOCl. Unreacted HOCl amounted to 3 millimoles. The solvent-free product weighed 18.5 g. and contained 80.5 percent $Ca(OCl)_2$ on an anhydrous basis and 3.2 percent of $Ca(OH)_2$. The yield of $Ca(OCl)_2$ based on lime was 92 percent.

EXAMPLE V

The procedure of Example I repeated with the substitution of HOCl in acetone gives a similar product.

EXAMPLE VI

The procedure of Example III repeated with the substitution of a solution of HOCl in diethyl ketone gives a similar product.

EXAMPLE VII

The procedure of Example III repeated with the substitution of a solution of HOCl in acetonitrile gives a similar product.

EXAMPLE VIII

The procedure of Example III repeated with the substitution of a solution of HOCl in di-n-propyl ketone gives a similar product.

EXAMPLE IX

The procedure of Example III repeated with the substitution of a solution of HOCl in propionitrile gives a similar product.

EXAMPLE X

The procedure of Example III repeated with the substitution of a solution of HOCl in methyl propionate gives a similar product.

What is claimed is:
1. Process for preparing calcium hypochlorite by the steps of (1) mixing dry solid lime with an essentially nonaqueous solution of hypochlorous acid essentially free from calcium chloride in an inert solvent selected from the class consisting of lower alkyl ketones, lower alkyl cyanides and lower alkyl esters of lower alkanoic acids, said solution containing from 0.1 to 5 percent of water and the molar ratio of hypochlorous acid to lime being at least 2:1 at a temperature of from $-25°$ to $+30°$ C. to form a slurry of calcium hypochlorite dihydrate in said solvent and (2) separating said calcium hypochlorite dihydrate from said slurry.

2. Process as claimed in claim 1 in which said lime is quicklime.

3. Process as claimed in claim 1 in which said lime is slaked lime.

4. Process as claimed in claim 1 in which said solvent is methyl ethyl ketone.

5. Process as claimed in claim 4 in which said solution in methyl ethyl ketone contains from 0.5 to 50 percent by weight of HOCl.

6. Process as claimed in claim 1 in which the thus separated calcium hypochlorite dihydrate is dehydrated to contain less than 2 percent by weight of water.

References Cited

UNITED STATES PATENTS

| | | | |
|---|---|---|---|
| 1,481,039 | 1/1924 | Taylor et al. | 23—86 |
| 1,481,040 | 1/1924 | Taylor et al. | 23—86 |
| 1,632,485 | 6/1927 | MacMullin | 23—86 |
| 1,919,304 | 6/1933 | Reitz et al. | 23—86 |
| 1,923,210 | 8/1933 | Jaeger | 23—86 |
| 2,696,306 | 12/1954 | Gomary | 23—86XR |
| 3,346,646 | 10/1967 | Kokorudz | 23—86XR |

FOREIGN PATENTS

| | | | |
|---|---|---|---|
| 232,560 | 7/1925 | Great Britain | 23—86 |

OTHER REFERENCES

J. W. Mellor's "A Comprehensive Treatise on Inorganic and Theoretical Chemistry," vol. 2, 1922 ed., p. 256. Longmans, Green & Co., New York.

EDWARD STERN, Primary Examiner

U.S. Cl. X.R.

23—153, 154, 312